United States Patent
Kato et al.

(10) Patent No.: US 10,834,060 B2
(45) Date of Patent: *Nov. 10, 2020

(54) FILE SHARING AND POLICY CONTROL BASED ON FILE LINK MECHANISM

(71) Applicant: International Business Machines Corporation, Armonk, NY (US)

(72) Inventors: Junichi Kato, Tokyo (JP); Takayuki Kushida, Tokyo (JP); Tomoko Murayama, Kanagawa-ken (JP); Masaharu Sakamoto, Kanagawa (JP); Kazuto Yamafuji, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/185,885

(22) Filed: Nov. 9, 2018

(65) Prior Publication Data
US 2019/0095639 A1    Mar. 28, 2019

Related U.S. Application Data

(63) Continuation of application No. 15/484,668, filed on Apr. 11, 2017, now Pat. No. 10,248,808.

(51) Int. Cl.
*H04L 29/06* (2006.01)
*G06F 16/176* (2019.01)
*G06F 21/62* (2013.01)

(52) U.S. Cl.
CPC ........ *H04L 63/0435* (2013.01); *G06F 16/176* (2019.01); *G06F 21/6209* (2013.01); *H04L 63/045* (2013.01); *H04L 63/0442* (2013.01); *H04L 63/061* (2013.01); *H04L 2463/062* (2013.01)

(58) Field of Classification Search
CPC ............... G06F 21/6218; G06F 21/602; G06F 17/30165; H04L 63/0435; H04L 63/061; H04L 63/0442
See application file for complete search history.

(56) References Cited

U.S. PATENT DOCUMENTS 9,049,176 B2    6/2015  Ferdowsi et al.
2004/0117621 A1*  6/2004  Knight .................... G06F 9/468
                                                                            713/165

(Continued)

OTHER PUBLICATIONS

"ACL Technology Overview", https://msdn.microsoft.com/ja-jp/library/ms229742%28v=vs.110%29.aspx, Microsoft, 2017, 1 page.

(Continued)

*Primary Examiner* — Amir Mehrmanesh
(74) *Attorney, Agent, or Firm* — Will Stock; Edell, Shapiro & Finnan, LLC

(57) ABSTRACT

A method, a computing system and a computer program product are provided. A link for use by a user to access a file is created. Content of the file is encrypted using a common key. The common key is encrypted using a public key of the user and is registered in the link. Access rights regarding the file are set for the user and registered in the link. The link includes information for use by the user to access the file when the access rights indicate that the user is authorized to access the file.

12 Claims, 8 Drawing Sheets

(56) References Cited

U.S. PATENT DOCUMENTS

| | | | |
|---|---|---|---|
| 2010/0306283 A1* | 12/2010 | Johnson | G06F 16/125 |
| | | | 707/803 |
| 2012/0278281 A1 | 11/2012 | Meisels et al. | |
| 2013/0061055 A1* | 3/2013 | Schibuk | G06Q 20/223 |
| | | | 713/172 |
| 2014/0067865 A1 | 3/2014 | Kirigin | |
| 2014/0164776 A1* | 6/2014 | Hook | G06F 21/6218 |
| | | | 713/171 |
| 2018/0293395 A1 | 10/2018 | Kato et al. | |

OTHER PUBLICATIONS

List of IBM Patents or Patent Applications Treated as Related, Nov. 2018, 1 page.

* cited by examiner

FILE SHARING AND POLICY CONTROL BASED ON FILE LINK MECHANISM

CROSS-REFERENCE TO RELATED APPLICATIONS

This application is a continuation of U.S. patent application Ser. No. 15/484,668, entitled "FILE SHARING AND POLICY CONTROL BASED ON FILE LINK MECHANISM" and filed on Apr. 11, 2017, the disclosure of which is incorporated herein by reference in its entirety.

BACKGROUND

Present invention embodiments are related to systems, methods and computer program products for creating and using a link as an entry point for accessing a protected file in a file system. In particular, present invention embodiments relate to systems, methods and computer program products for accessing a protected file via a link mechanism that includes access rights information with respect to the file and may include key information for accessing keys for decrypting content of the file.

In existing file systems, access rights to a file are divided into three categories: owner rights, group rights, and management rights. Information regarding which user or group can decrypt content of a file is managed as a policy separate from the access rights to the file. Thus, existing file systems require policy management and file access rights management to be set and managed separately and consistently.

An increase in a number of directories and files to be managed in existing file systems, which manage access rights and decryption policy separately, makes it difficult to determine what access is actually permitted and to which user or group.

SUMMARY

In a first aspect of the invention, a machine-implemented method is provided for accessing a file. A computing device creates multiple links to a file, each of the multiple links is for a respective user of a number of users to access the file. The computing device encrypts content of the file by using a common key. The common key is encrypted using a respective public key of each respective user to produce a respective encrypted common key for the each respective user. The respective encrypted common key for the each respective user is registered in a respective link of the multiple links. Respective access rights regarding the file are set for the each respective user. The respective access rights for the each respective users are registered in the respective link of the multiple links. Access to the content of the file is permitted or denied for the each respective user based on information stored in the respective link of the plurality of links.

In a second aspect of the invention, a computing system includes at least one processor and at least one memory connected to the at least one processor. The at least one processor is configured to perform: creating multiple links to a file, each of the multiple links being for use by a respective user of a number of users to access the file; encrypting content of the file by using a common key; encrypting the common key using a respective public key of each respective user to produce a respective encrypted common key for the each respective user; registering the respective encrypted common key for the each respective user in a respective link of the multiple links; setting respective access rights regarding the file for the each respective user; registering the respective access rights for the each respective user in the respective link of the multiple links. Access to the content of the file is permitted or denied for the each respective user based on information stored in the respective link of the plurality of links.

In a third aspect of the invention, a computer program product includes at least one computer readable storage medium having computer readable program code embodied therewith for execution on at least one processor. The computer readable program code is configured to be executed by the at least one processor to perform: creating multiple links to a file, each of the multiple links being for use by a respective user of a number of users to access the file; encrypting content of the file by using a common key; encrypting the common key using a respective public key of each respective user to produce a respective encrypted common key for the each respective user; registering the respective encrypted common key for the each respective user in a respective link of the multiple links; setting respective access rights regarding the file for the each respective user; registering the respective access rights for the each respective user in the respective link of the multiple links; and permitting or denying access to the content of the file for the each respective user based on information stored in the respective link of the plurality of links.

BRIEF DESCRIPTION OF THE DRAWINGS

Generally, like reference numerals in the various figures are utilized to designate like components.

DETAILED DESCRIPTION

Present invention embodiments include methods, computing systems and computer program products for accessing a file. In various embodiments, a file may be accessed via a link structure that includes information for accessing content of the file. The link structure may be created and may include owner information regarding an owner of the file and key information for obtaining a key to decrypt encrypted content of the file. A common key may be obtained and used to encrypt the content of the file. Information for accessing the encrypted content of the file may be included within the link structure. The common key may be encrypted using a public key of a user associated with the link structure. The encrypted common key may be registered in the link structure such that the user may obtain the encrypted common key at a later time. Access rights may be set indicating whether the user is authorized to have read access or read and write access to the file. The set access rights may be registered in the link structure.

The user may request to read the content of the file by providing a private key of the user. The link structure associated with the user and the file may be accessed and access rights information, indicating whether the user is authorized to access the file, may be obtained from the link structure. If the user is authorized to access the file, the encrypted common key may be obtained from information included in the link structure. The private key of the user may be used to decrypt the encrypted common key and the common key may be used to decrypt the content of the encrypted file, which may then be read by, or provided to, the user.

Some users may be authorized to read a file, but may not be authorized to decrypt encrypted content of the file. One example of such a user may include, but not be limited to, an application for backing up encrypted content of the file. A link structure associated with such a user may not include information for accessing key information for decrypting the encrypted content of the file. The user may request to read the file without providing a private key of the user. Access rights information may be obtained from the link structure and a determination may be made regarding whether the user is authorized to read from or read from and write to the file. If the user is authorized to at least read from the file, the user may be provided with access to the encrypted content of the file via information included in the link structure. Otherwise, the user may be prevented from accessing the encrypted content of the file.

Figure 1:
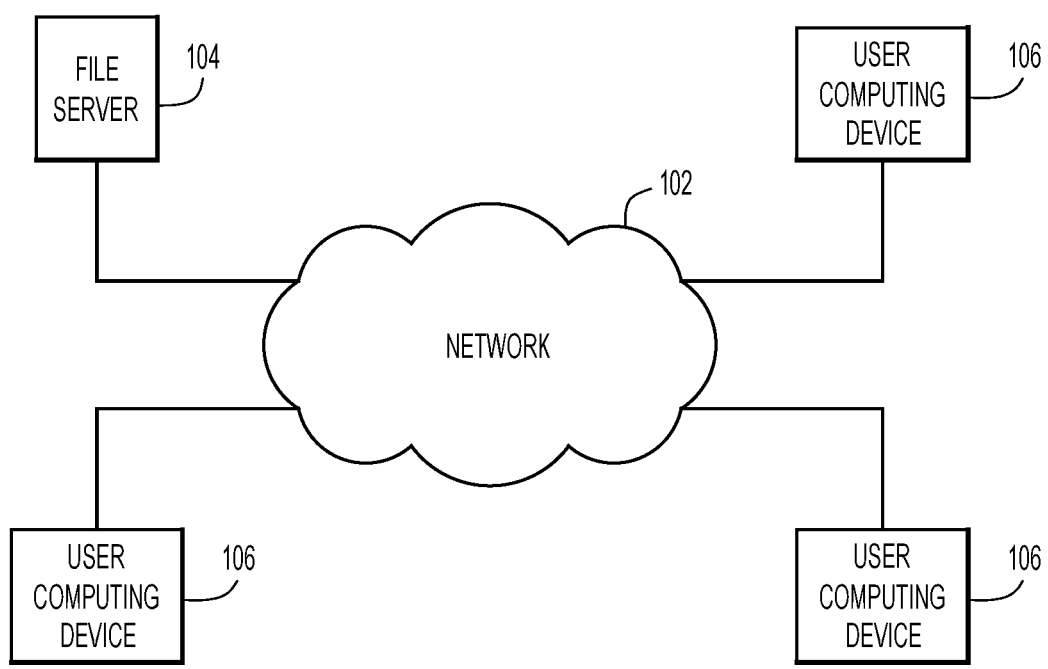
FIG. 1 illustrates an example environment for implementing various embodiments of the invention.

FIG. 1 shows an example environment 100 in which various embodiments may be implemented. The example environment may include a network 102, a file server 104, and a number of user computing devices 106. Network 102 may include a local area network (LAN), a wide area network (WAN), a public switched data network (PSDN), a wireless network, a wired network, the Internet, an intranet, other types of networks, or any combination of the above. File server 104 and user computing devices 106 may be connected to network 102. Users may attempt to access one or more files via file server 104 from their respective user computing devices 106 and network 102.

In some embodiments, an example environment may include a standalone computing device for use by various users to access one or more files that may be stored on a local storage medium of the standalone computing device.

Figure 2:
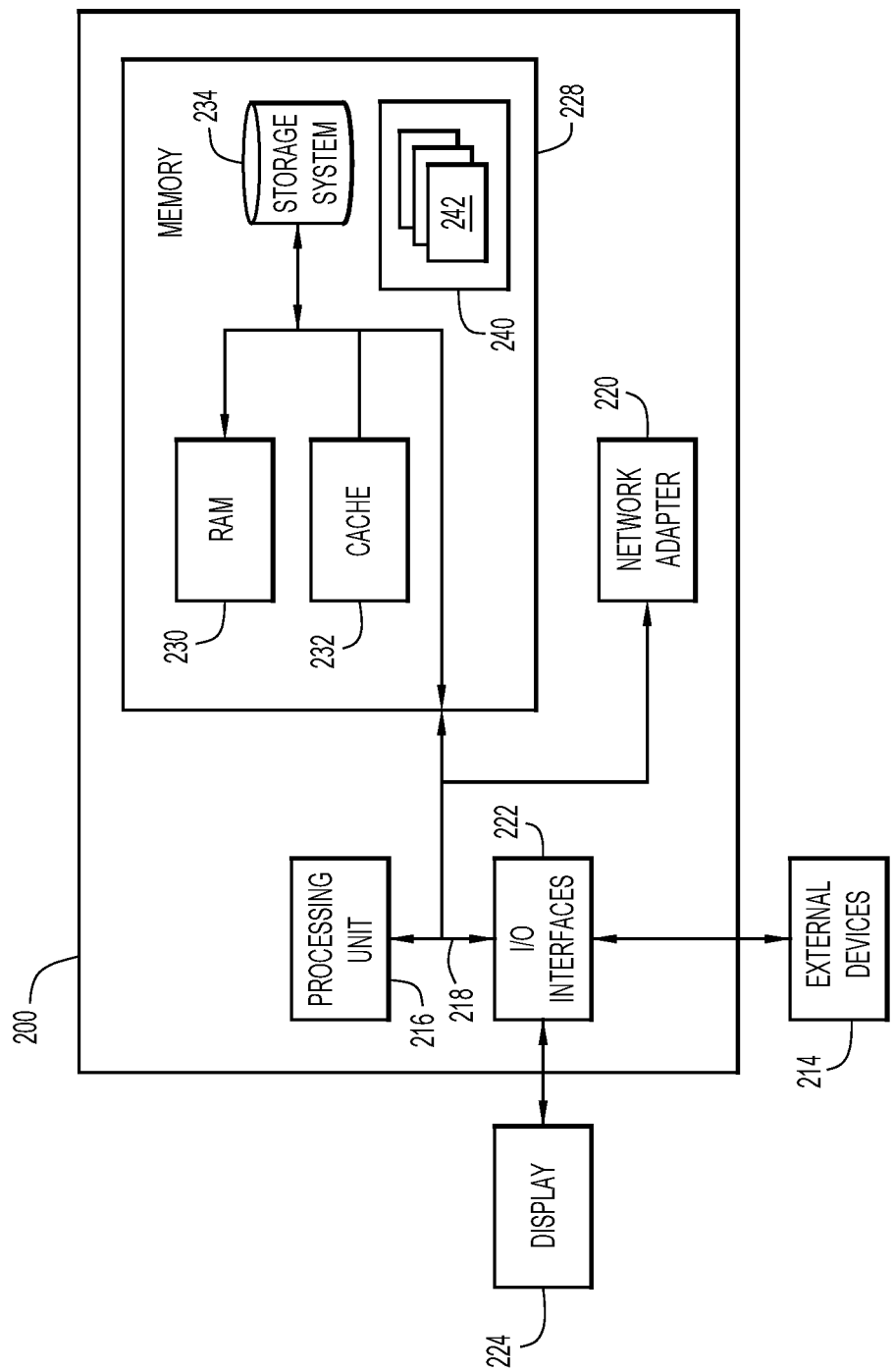
FIG. 2 is a block diagram of an example computing system that may be used to implement embodiments of the invention.

FIG. 2 illustrates at least a portion of a computing system 200 that may be used to implement file server 104, user computing device 106, or a computing device in a standalone environment. Computing system 200 may include, but not be limited to, one or more processors or processing units 216, a system memory 228, and a bus 218 that couples various system components including system memory 228 to one or more processors 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 typically includes a variety of computer system readable media. Such media may be any available media that is accessible by computing system 200, and includes both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. Storage system 234 may include other types of storage for reading and writing including, but not limited to, flash memory and Secure Digital (SD) card. Storage system 234 can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, a display 224, etc.; one or more devices that enable a user to interact with computing system 200; and/or any devices (e.g., network card, modem, etc.) that enable computer system 200 to communicate, either wired or wirelessly, with one or more other computing systems. Such communication can occur via Input/Output (I/O) interfaces 222. Still yet, computing system 200 can communicate with one or more networks such as a local area network (LAN), a general wide area network (WAN), and/or a public network (e.g., the Internet) via network adapter 220. As depicted, network adapter 220 communicates with other components of computing system 200 via bus 218. It should be understood that, although not shown, other hardware and/or software components could be used in conjunction with computing system 200. Examples, include, but are not limited to: microcode, device drivers, and redundant processing units, etc.

Figure 3:
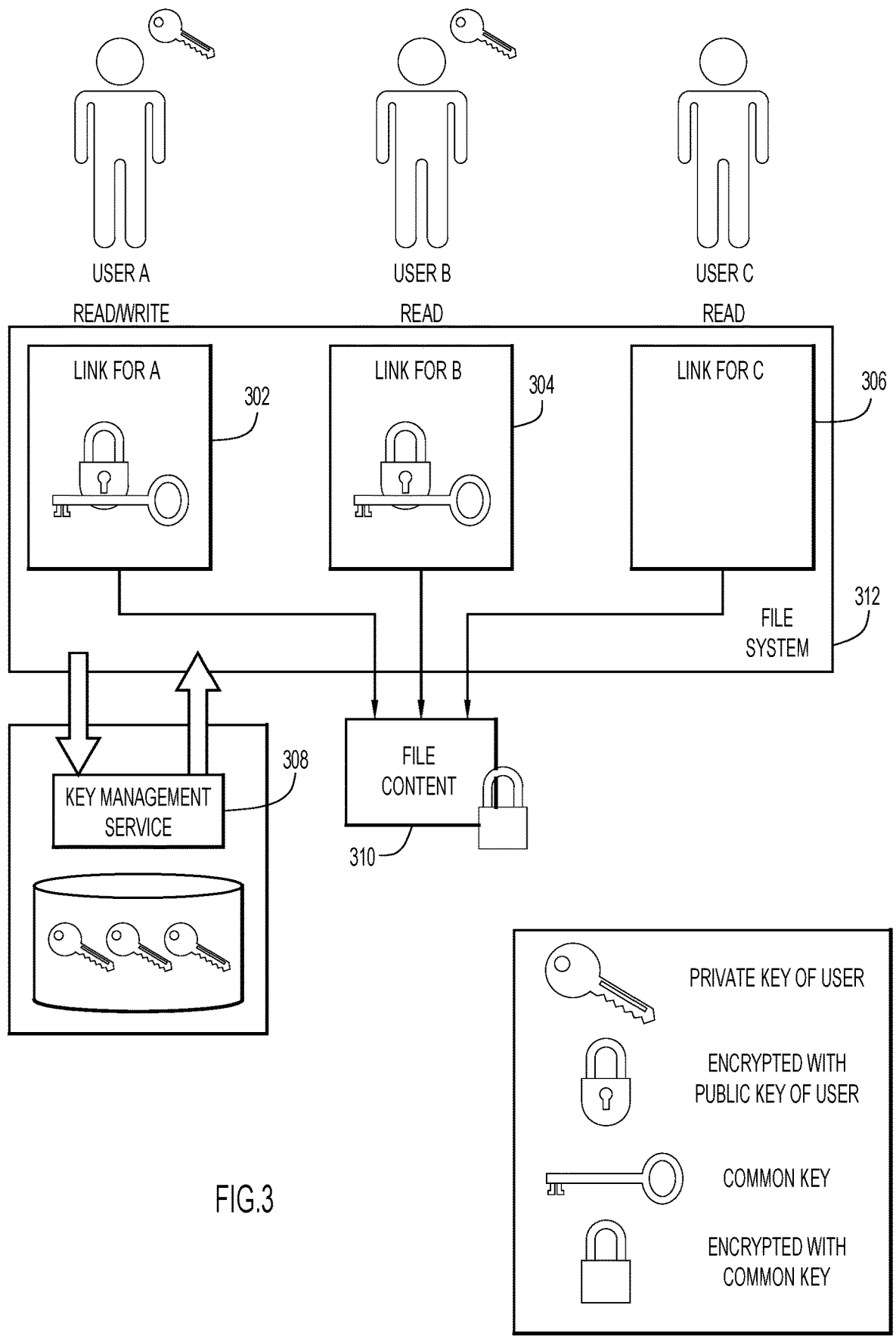
FIG. 3 illustrates a number of aspects of invention embodiments regarding links to file content for use by multiple users with different access and decryption rights.

FIG. 3 illustrates a number of aspects of embodiments of the invention. User A is authorized for read and write access to a file and has a private key, user B is authorized for read access to the file and has a private key, and user C has read access to the file and has no key. Users A, B and C may access the file via link structures 302, 304, 306, respectively, included in a file system 312 of a computing device. Link structures 302, 304 may include information for obtaining a common key, which may be used to decrypt file content 310 encrypted using the common key. File system 312 may perform key management of users' private keys in collaboration with an external key management service 308. Each of link structures 302, 304, 306 may include access rights information indicating whether a respective user associated with a link structure is authorized to read or read and write file content 310. Link structures 302, 304 may include information for obtaining the common key encrypted by using a public key of user A and user B, respectively. Because link structure 306, associated with a user C, has no key information stored therein, user C may be authorized to read encrypted file content 310, but may not be authorized to decrypt encrypted file content 310.

Figure 4:
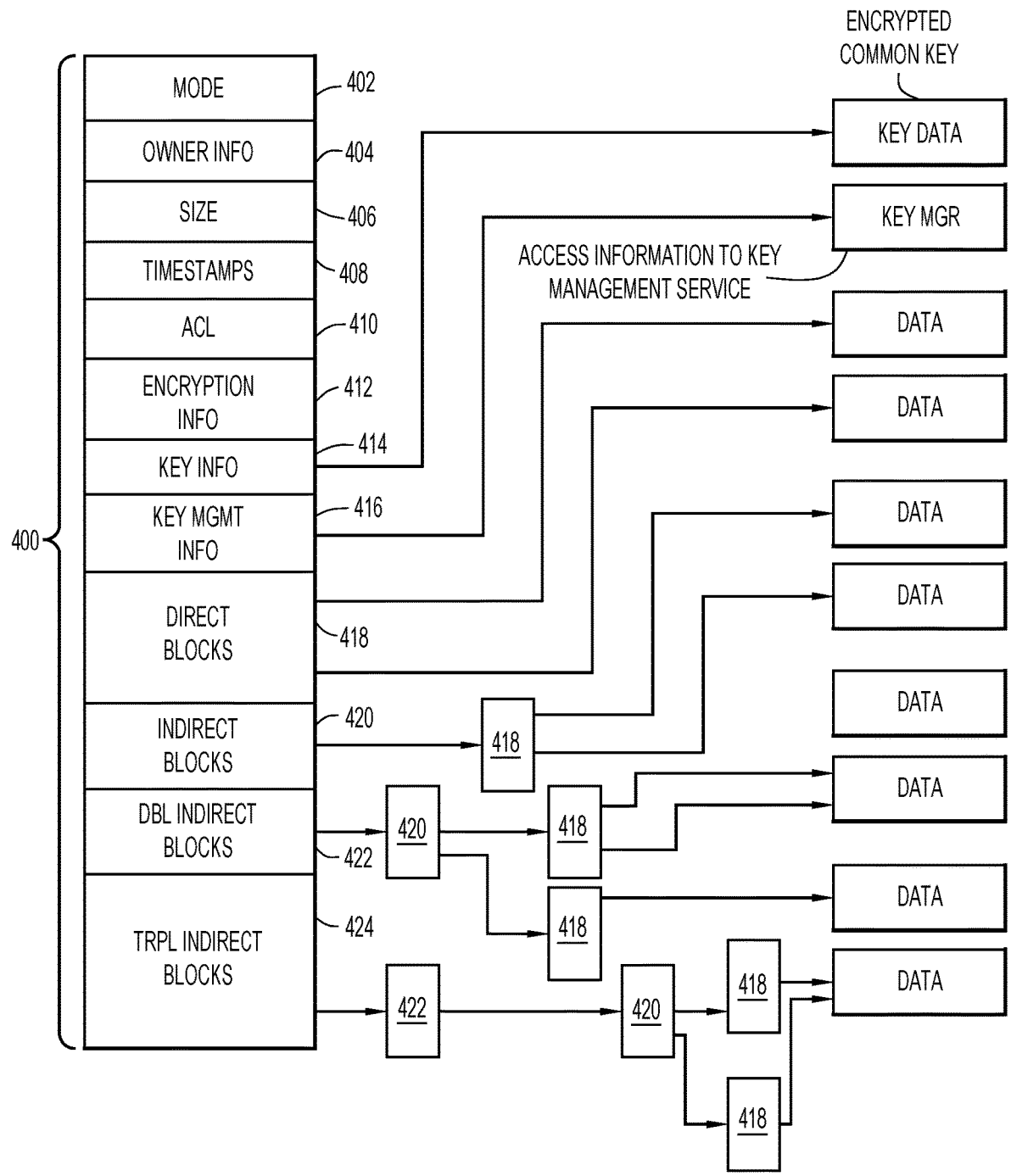
FIG. 4 shows an example link structure for use in embodiments of the invention.

FIG. 4 illustrates an example link structure 400, which may be used in various embodiments. Mode 402 may indicate whether a link structure includes access rights information and a link to encrypted contents of a file. Owner information 404 may include information about an owner of the file associated with link structure 400. Size may include information regarding a size of link structure 400. Timestamps 408 may include timestamps regarding certain activity such as reading from and/or writing to the file. Access control list (ACL) 410 may include access rights with respect to the file for the user associated with link structure 400. Encryption information 412 may include information regarding a type of encryption algorithm used to encrypt the content of the file. Key information 414 may include information regarding a common key encrypted by using a public key of the user associated with link structure 400. Key management information 416 may include information for accessing a key management service. Direct blocks 418 may include information for directly accessing the encrypted content of the file. Indirect blocks 420 may include information for accessing a direct block for accessing the encrypted content of the file. Double indirect blocks 422 may include information for accessing an indirect block that accesses a direct block for directly accessing the encrypted content of the file. Triple indirect blocks 424 may include information for accessing a double indirect block that accesses an indirect block that further accesses a direct block for accessing the encrypted content of the file.

Figure 5:
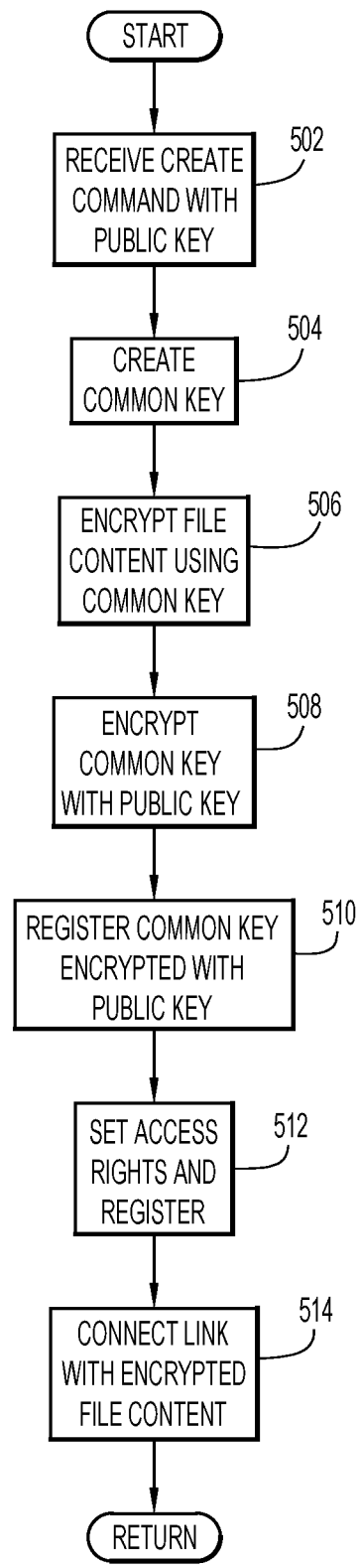
FIG. 5 is a flowchart that illustrates an example process for encrypting a file and creating a link to encrypted content of the file for use by a user according to an embodiment of the invention.

FIG. 5 is a flowchart of an example process for creating a link to a file and encrypting the file. The process may begin with a file system of a computing device receiving a create command with a public key of a user who is to be associated with a link structure (act 502). The file system may create a common key (act 504) and may encrypt content of the file, using the common key, and store the encrypted content of the file (act 506). The common key may be encrypted with the public key of the user (act 508) and may be registered in the link structure (act 510). Access rights to the file for the user may then be set and registered in the link structure (act 512). Information for accessing the encrypted content of the file may then be stored in the link structure (act 514). The information for accessing the encrypted content may be stored in direct blocks, indirect blocks, double indirect blocks and triple indirect blocks in the link structure as previously described with respect to FIG. 4.

Figure 6:
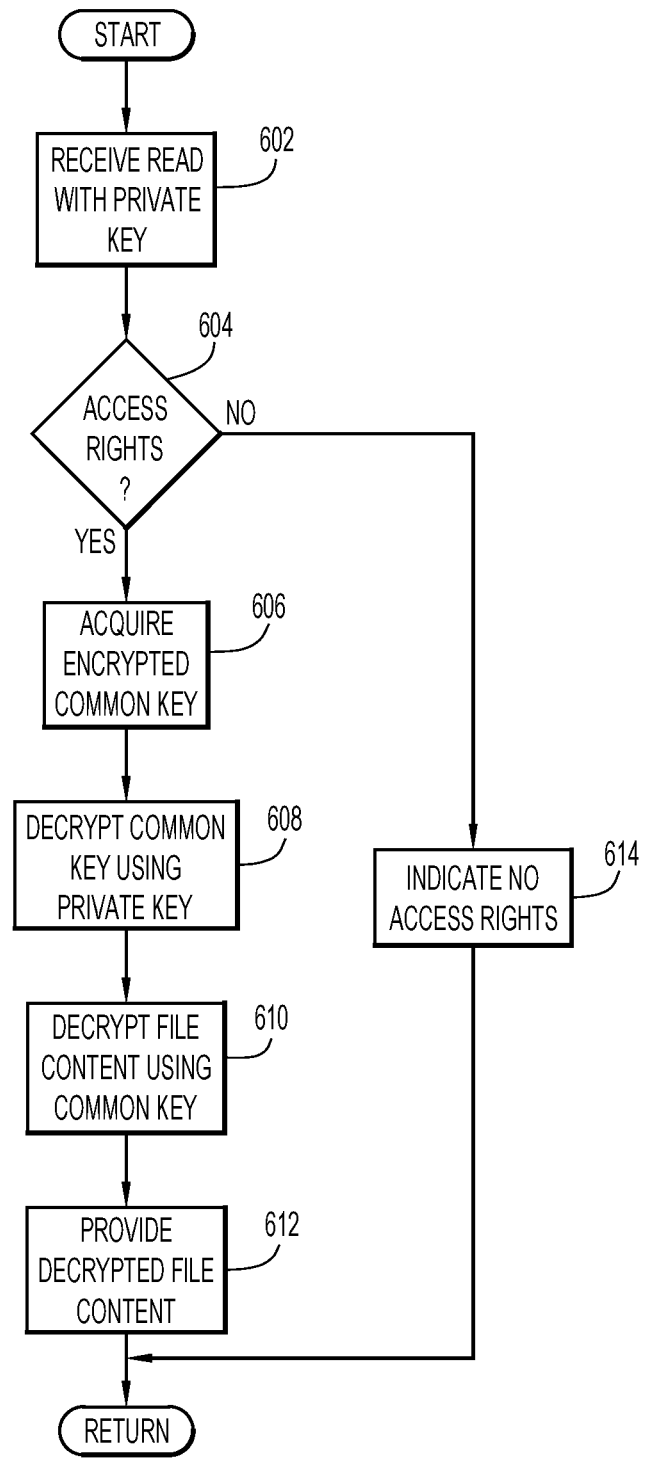
FIG. 6 is a flowchart that illustrates an example process for permitting a user to read content of a file according to an embodiment of the invention.

FIG. 6 is a flowchart of an example process for a user to read content of an encrypted file using a link structure. The process may begin with the file system receiving a read command for a file and a private key of the user (act 602). The file system may access a link structure associated with the user and the file that the user wishes to access and may obtain access rights information included in the link structure in order to determine whether the user is authorized to access the file (act 604). If the user is not authorized to access the file, then an indication may be provided to inform the file system that the user is not authorized to have access to the file (act 614). Otherwise, the file system may acquire an encrypted common key via the link structure (act 606) and may decrypt the encrypted common key using the private key of the user (act 608). The file system may obtain access to the encrypted content of the file via at least one of direct blocks, indirect blocks, double indirect blocks and triple indirect blocks included in the link structure and may decrypt the encrypted content using the common key (act 610). Decrypted content of the file may then be provided to the user (act 612).

Figure 7:
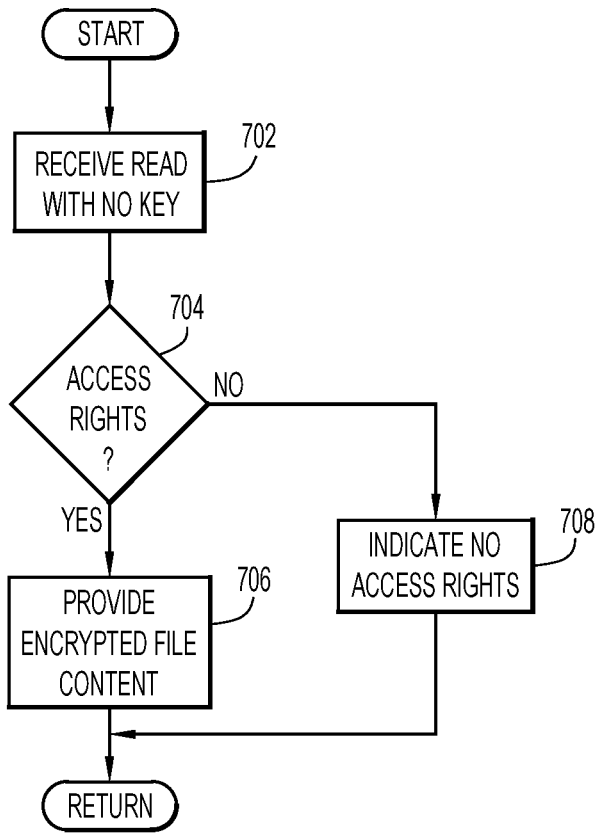
FIG. 7 is a flowchart of an example process for permitting a user to read encrypted content of a file according to an embodiment of the invention.

In some situations a user may be authorized to have access to encrypted content of a file, but may not be authorized to decrypt the encrypted content of the file. One example of such a situation includes a user that is actually an application for backing up a file. The application may be authorized to access the encrypted content of the file, but may not be authorized to decrypt the encrypted content of the file. FIG. 7 is a flowchart of an example process for reading encrypted content of a file when a user is not authorized to decrypt the content of the file. The process may begin with the file system receiving a read command for a user with respect to a file (act 702). The read command may not include a key. The file system may access a link structure associated with the file and the user requesting access to the file in order to obtain access rights information included in the link structure to determine whether the user is authorized to access the file (act 704). If the user is not authorized to access the file, then an indication may be provided to indicate that the user is not authorized to access the file (act 708). Otherwise, information for accessing encrypted content of the file may be obtained from the link structure and the encrypted content may be provided to the user (act 706). The information for accessing the encrypted content of the file may include at least one of direct blocks, indirect blocks, double indirect blocks and triple indirect blocks included in the link structure.

Figure 8:
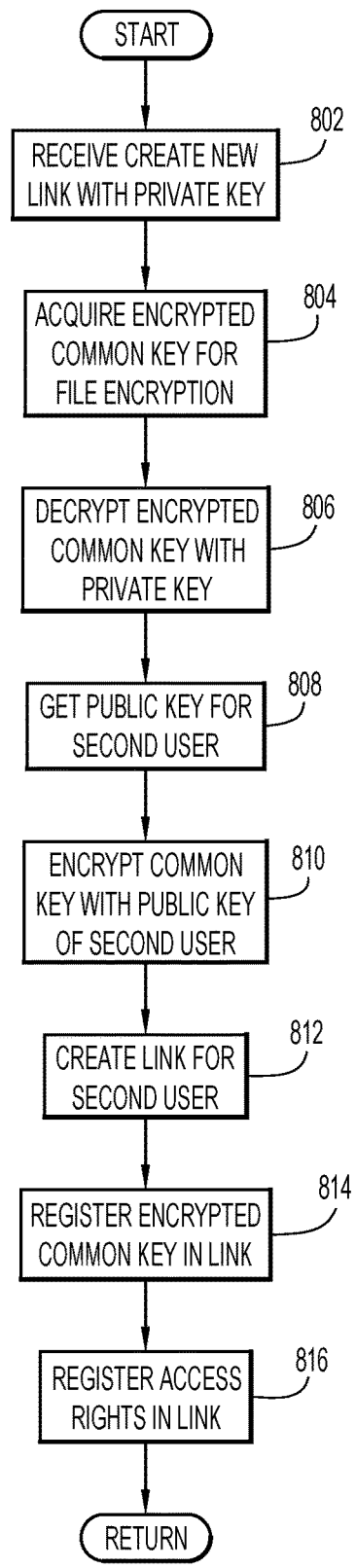
FIG. 8 is a flowchart of an example process that permits a user to create a new link to content of an existing file for a second user according to an embodiment of the invention.

FIG. 8 is a flowchart of an example process for creating a new link structure for a second user to access existing encrypted content of a file. The process may begin with a file system receiving a create command and a private key of a first user and obtaining access to a link structure associated with the file and the first user (act 802). A common key encrypted using a public key of the first user may be acquired via the link structure (act 804). The encrypted common key may then be decrypted using the private key of the first user (act 806). A public key for a second user may be obtained by accessing key management information in the link structure and using the key management information in collaboration with a key management service (act 808). The common key may then be encrypted using the public key of the second user (act 810). The file system may then create a link structure for the second user, which will include information for accessing encrypted content of the file (act 812). The information for accessing the encrypted content of the file may include at least one of direct blocks, indirect blocks, double indirect blocks and triple indirect blocks for accessing the encrypted content of the file. The encrypted common key may then be registered into the newly created link structure (act 814) and access rights information regarding the second user's authorization to access the file may be set and registered in the newly created link structure (act 816).

Other embodiments may include creation and use of a link structure for accessing a folder that may include one or more files. The link structure may be similar to the link structure shown in FIG. 4, but may include information for accessing an encrypted folder instead of encrypted content of a file. The link structure of these embodiments may include at least one of direct blocks, indirect blocks, double indirect blocks and triple indirect blocks for accessing encrypted content of a folder. Other aspects of these embodiments are similar to the previously discussed embodiments. The example process described in FIGS. 5-8 may be altered to apply to these other embodiments by changing references to a file and encrypted contents of the file to be references to a folder and encrypted contents of the folder. Similarly, access rights information included in the link structure may pertain to access rights of a user with respect to being authorized to access encrypted content of the folder.

Invention embodiments have a number of advantages over existing file systems. For example, embodiments of the invention may store a single copy of an encrypted file that may be accessed by a number of users having differing access rights and decryption rights. Further, in existing file systems, one file may have only one owner. However, in embodiments of the invention, owner information is stored in a link structure. As a result, a number of link structures may include information for accessing encrypted content of a same file and each of the link structures may include owner information for respective different owners, thereby making it possible for multiple owners to share the same file as shared owners.

The environment of the present invention embodiments may include any number of computers or other processing systems (e.g., client or end-user systems, server systems, etc.), where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A machine-implemented method for accessing a file, the method comprising:
   creating, by a computing device, a plurality of links to a file, each of the plurality of links being for use by a respective user of a plurality of users to access the file;
   encrypting, by the computing device, content of the file by using a common key;
   encrypting, by the computing device, the common key using a respective public key of each respective user to produce a respective encrypted common key for the each respective users;
   registering, by the computing device, the respective encrypted common key for the each respective user in a respective link of the plurality of links;
   setting, by the computing device, respective access rights regarding the file for the each respective user;
   registering, by the computing device, the respective access rights for the each respective user in the respective link of the plurality of links; and
   permitting access to the content of the file for a respective user only when a request to access the file is received including a private key of the respective user, and the access rights registered in one of the plurality of created links for use by the respective user indicating that the respective user is authorized to access the file.

2. The machine-implemented method of claim 1, further comprising:
   performing key management of private keys of the plurality of users in collaboration with an external key management service.

3. The machine-implemented method of claim 1, further comprising:
   obtaining encryption information included in the one of the plurality of created links to the file;
   determining whether the respective user is authorized to decrypt the content of the file based on the encryption information; and
   decrypting the content of the file, when the respective user is determined to be authorized to decrypt the content of the file, to produce a decrypted content of the file, wherein
   the permitting access to the content of the file includes allowing access to the decrypted content of the file when the respective user is determined to be authorized to decrypt the content of the file.

4. The machine-implemented method of claim 3, wherein the decrypting of the content of the file further comprises:
   obtaining an encrypted common key via key information included in the one of the plurality of created links to the file,
   decrypting the encrypted common key with the private key of the respective user to produce the common key, and
   decrypting the content of the file using the common key.

5. A computing system comprising:
   at least one processor; and
   at least one memory connected to the at least one processor, wherein the at least one processor is configured to perform:
   creating a plurality of links to a file, each of the plurality of links being for use by a respective user of a plurality of users to access the file;
   encrypting content of the file by using a common key;
   encrypting the common key using a respective public key of each respective user to produce a respective encrypted common key for the each respective user;
   registering the respective encrypted common key for the each respective user in a respective link of the plurality of links;
   setting respective access rights regarding the file for the each respective user;
   registering the respective access rights for the each respective user in the respective link of the plurality of links; and
   permitting access to the content of the file for a respective user only when a request to access the file is received including a private key of the respective user, and the access rights registered in one of the plurality of created links for use by the respective user indicating that the respective user is authorized to access the file.

6. The computing system of claim 5, wherein the at least one processor is further configured to perform:
   performing key management of private keys of the plurality of users in collaboration with an external key management service.

7. The computing system of claim 5, wherein the at least one processor is further configured to perform:
   obtaining encryption information included in the one of the plurality of created links to the file;
   determining whether the respective user is authorized to decrypt the content of the file based on the encryption information; and
   decrypting the content of the file, when the respective user is determined to be authorized to decrypt the content of the file, to produce a decrypted content of the file, wherein
   the permitting access to the content of the file includes allowing access to the decrypted content of the file when the respective user is determined to be authorized to decrypt the content of the file.

8. The computing system of claim 7, wherein the decrypting of the content of the file further comprises:
   obtaining an encrypted common key via key information included in the one of the plurality of created links to the file,
   decrypting the encrypted common key with the private key of the respective user to produce the common key, and
   decrypting the content of the file using the common key.

9. A computer program product comprising:
   at least one computer readable storage medium having computer readable program code embodied therewith for execution on at least one processor, the computer readable program code being configured to be executed by the at least one processor to perform:
   creating a plurality of links to a file, each of the plurality of links being for use by a respective user of a plurality of users to access the file;
   encrypting content of the file by using a common key;
   encrypting the common key using a respective public key of each respective user to produce a respective encrypted common key for the each respective user;

registering the respective encrypted common key for the each respective user in a respective link of the plurality of links;

setting respective access rights regarding the file for the each respective user;

registering the respective access rights for the each respective user in the respective link of the plurality of links; and permitting access to the content of the file for a respective user only when a request to access the file is received including a private key of the respective user, and the access rights registered in one of the plurality of created links for use by the respective user indicating that the respective user is authorized to access the file.

10. The computer program product of claim 9, wherein the computer readable program code is further configured to be executed by the at least one processor to perform:

performing key management of private keys of the plurality of users in collaboration with an external key management service.

11. The computer program product of claim 9, wherein the computer readable program code is further configured to be executed by the at least one processor to perform:

obtaining encryption information included in the one of the plurality of created links to the file;

determining whether the respective user is authorized to decrypt the content of the file based on the encryption information; and decrypting the content of the file, when the respective user is determined to be authorized to decrypt the content of the file, to produce a decrypted content of the file, wherein the permitting access to the content of the file includes allowing access to the decrypted content of the file when the respective user is determined to be authorized to decrypt the content of the file.

12. The computer program product of claim 11, wherein the decrypting of the content of the file further comprises:

obtaining an encrypted common key via key information included in the one of the plurality of created links to the file, decrypting the encrypted common key with the private key of the respective user to produce the common key, and decrypting the content of the file using the common key.

* * * * *